United States Patent [19]

Duranleau et al.

[11] 3,927,048

[45] Dec. 16, 1975

[54] PREPARATION OF ALKYLAMIDES

[75] Inventors: Roger George Duranleau, Ardonia; Richard F. Love, Fishkill, both of N.Y.

[73] Assignee: Texaco, Inc., New York, N.Y.

[22] Filed: Dec. 12, 1974

[21] Appl. No.: 532,267

[52] U.S. Cl............................ 260/404; 260/561 R
[51] Int. Cl.$^2$........................................ C07C 103/02
[58] Field of Search................. 260/404, 561 R

[56] References Cited
UNITED STATES PATENTS

| | | | |
|---|---|---|---|
| 3,551,465 | 12/1970 | Ellis | 260/404 |
| 3,562,302 | 2/1971 | Ellis | 260/561 R |
| 3,772,358 | 11/1973 | Lanq | 260/404 |
| 3,776,901 | 12/1973 | Kelly et al. | 260/561 R |
| 3,862,185 | 1/1975 | Love et al. | 260/561 R |

*Primary Examiner*—C. Davis
*Attorney, Agent, or Firm*—T. H. Whaley; C. G. Ries; George J. Darsa

[57] ABSTRACT

Alkylamides are prepared by contacting an alpha-nitroketone in the presence of formic acid at about 80° to 160°C.

10 Claims, No Drawings

PREPARATION OF ALKYLAMIDES

BACKGROUND OF THE INVENTION

This invention relates to a novel method of preparing alkylamides. In particular, this invention relates to a method for preparing alkylamides from nitroketones by converting the nitroketone in the presence of a material simultaneously acting as catalyst and solvent for the reaction.

Heretofore, alkylamides could be prepared by the amination of carboxylic acids. Unfortunately, many of the carboxylic acids are not generally available, particularly those possessing an odd number carbon chain. To prepare such acids however requires the use of expensive reactants. For example, carboxylic acids can be prepared by oxidizing the corresponding alcohol or by Grignard synthesis and in each case costly starting materials are required. Alternatively, alkylamides can be prepared by converting nitro-nitrosoalkane dimers by reaction with at least molar amounts of an anhydrous mineral acid for relatively short contact times. This method, however, is not commercially attractive, since the mineral acid is consumed in the course of the reaction and low concentrations of the acid reactant must be employed to avoid explosive reactions. Further, the reaction is sensitive to water in that the alkylamides are easily hydrolyzed to their acids.

A novel method has now been found whereby a range of single or mixtures of alkylamides having from 2 to 51 carbon atoms can be provided in good yields and where the method employs a material which combines to function as acid and solvent for the reaction.

SUMMARY OF THE INVENTION

Broadly, this invention contemplates a method of preparing an alkylamide which comprises contacting a nitroketone with formic acid. Formic acid, according to our method, has been found to function as both catalyst and solvent in the instant method. The unique ability of formic acid to carry out the functions described above additionally provides the method with a simplified recovery procedure.

According to this invention, the contemplated alkylamides are prepared from a 1-nitro-2-alkanone corresponding to the formula:

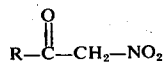

where R is an alkyl group having from 1 to 50 carbon atoms, preferably 5 to 30 carbons. Included as starting materials we mention 1-nitro-2-propanone, 1-nitro-2-butanone, 1-nitro-2-pentanone, 1-nitro-2-hexanone, 1-nitro-2-heptanone, 1-nitro-2-octanone, 1-nitro-2-decanone, 1-nitro-2-dodecanone, 1-nitro2-tetradecanone, 1-nitro-2-pentadecanone, 1-nitro-2-hexadecanone, 1-nitro-2-heptadecanone and 1-nitro-2-heneicosanone. Mixtures of 1-nitro-2-alkanones as starting materials are also contemplated and provide as product mixtures of amides. The nitroketones employed in the instant method are terminal alpha-nitroketones where the nitro group is on the terminal carbon and the keto group is on the carbon adjacent thereto. Non-terminal alpha-nitroketones, that is, a nitroketone where the nitro group is on other than the terminal carbon atom do not undergo the conversion to alkylamides as herein more fully described. The nitroketones employed as starting materials and described above can be prepared in accordance with the procedure described in the art, as for example in U.S. Pat. No. 3,557,166 where the starting material is a 1-olefin. Essentially, the nitroketone is prepared by contacting a 1-olefin having from 3 to 52 carbons at about −40° to 20°C. with dinitrogen tetroxide and oxygen, where the reactant mole ratios of olefin to $N_2O_4$ to $O_2$ is between about 1:0.5:1 and 1:1.5:30, thereby forming a nitroalkylperoxy nitrate intermediate. Thereafter the nitroperoxy intermediate is contacted with a denitrating agent at about 60° to 70°C. employing a mole ratio of denitrating agent to peroxy compound of at least 1:1 and to about 20:1, thereby forming the 1-nitro-2-alkanone.

The instant method is further explained by the following equation:

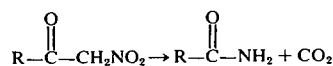

where R is as heretofore defined and where a by-product of the method is carbon dioxide. The formation of evolved carbon dioxide helps to drive the reaction to completion. It will be understood that the alkylamide formed in the course of the method possesses one carbon less than the starting alpha-nitroketone and that the conversion reaction involves transformation of the nitroketone through rearrangement and cleavage.

More specifically, the method of this invention involves catalytically converting an alpha-nitroketone or mixtures of alpha-nitroketones in the presence of formic acid at a temperature of between about 80° and 160°C., preferably from about 90° to 130°C. Temperatures below 80°C. are not practical as exceedingly long reaction times are required to form the amide and temperatures above 160°C. effect a substantial reduction in alkylamide formation along with the promotion of substantial amounts of undesired by-product acid formation. Further, the formic acid employed should be one containing less than about 5 percent water inasmuch as water promotes a competing reaction, namely the conversion of the nitroketones to the corresponding carboxylic acid. In a highly preferred embodiment substantially anhydrous formic acid is employed, that is formic acid having less than 3 percent water. An inert diluent boiling between about 80° and 160°C. can also be employed such as chlorobenzene or cumene.

In accordance with our method, the nitroketone is contacted with formic acid employing mole ratios of nitroketone to formic acid of between about 1:5 and 1:350, preferably between 1:10 and 1:200. At the reaction temperature specified above and at pressures ranging from about 0 to 300 p.s.i.g., the reaction time is suitably between about 1 and 24 hours.

The ability of formic acid to act as a catalyst for the reaction in addition to its function as the reaction medium in the instant method was unexpected inasmuch as such closely related acids as acetic, hydroxyacetic, chloroacetic and dichloroacetic acids do not act as catalysts in the instant method and fail to cause a reaction of the alpha-nitroketone to the corresponding amide.

Specific examples of alkylamides prepared according to the inventive method include acetamide, propanamide, butanamide, pentanamide, hexanamide, heptanamide, octanamide, nonanamide, undecanamide, tridecanamide, tetradecanamide, pentadecanamide and eicosanamide.

At the completion of the catalytic reaction, the alkylamide may be recovered from the formic acid by cooling the reaction to 60°C. or lower, diluting with water and recovering the crystallized solids. Alternatively the reaction mixture can be reduced in volume by vacuum evaporation whereupon the product will crystallize on cooling. Any by-products formed, such as the corresponding acid, can be separated from the amide by washing the crystallized product with a 5 percent aqueous solution of sodium hydroxide and water. The product, after drying, is essentially free of by-products. The co-product of the method, carbon dioxide, can be recovered if desired in the course of the reaction or at the completion thereof by scrubbing the exit gas with an amine base at room temperature and thereafter heating the amine-carbon dioxide complex so formed.

The alkylamides prepared according to the instant method are useful as foam stabilizers in synthetic detergents, ore flotation agents, solvents for waxes, dye solubilizers, plasticizers for polymers, fuel and lubricant additives, surfactants, dispersants or diluents for reactions and in the production of carbon paper, rubber and wax paper, as well as intermediates in the preparation of fabric water repellents.

In order to more fully illustrate the nature of our invention and the manner of practicing the same, the following examples are presented.

EXAMPLE I

A mixture of 4.00 grams (0.014 mole) of 1-nitro-2-hexadecanone and 100 milliliters (2.18 moles) of formic acid (97 percent acid — 3 percent water) were heated at a temperature of 100°C. and samples were periodically withdrawn, cooled and poured into 25 milliliters of ice water, stirred for 5 minutes and filtered. The collected solids were thereafter vacuum dried and analyzed by infrared. Sampling of the product after about 3 hours shows a nitroketone conversion of about 25 percent with a selectivity of 80 percent to pentadecanamide as determined by infrared and nuclear magnetic resonance analysis. After 24 hours, the sample showed 100 percent conversion of the starting material with a selectivity to pentadecanamide of 60 percent. A by-product of the reaction was pentadecanoic acid.

EXAMPLE II

A solution of 2.0 grams (0.007 mole) of 1-nitro-2-hexadecanone in 100 milliliters (1.75 mole) of acetic acid was heated to 85°C. for 6 hours. The reaction mixture was evaporated under vacuum and the residue, 1.93 grams, was determined to be unreacted nitroketone starting material.

This example was repeated except that reaction temperatures of 100° and 118°C. were employed and the recovered residue was the starting nitroketone.

The example was again repeated and in the presence of 6.2 grams of water added to the solution. After a reaction time of 24 hours the recovered residue was identified as the starting nitroketone.

EXAMPLE III

A mixture of 4.0 grams (0.14 mole) of 1-nitro-2-hexadecanone in 100 grams of hydroxyacetic acid was heated to 47°C. for 1 hour and at 100°C. for 24 hours. The reaction mixture was then cooled and diluted with an equal volumne of ice water. The resulting cyrstals were recovered (3.84 grams) and identified by infrared and nuclear magnetic resonance to be the starting nitroketone.

The procedure was repeated except that 100 grams (1.05 mole) of chloroacetic acid was employed and the reaction temperature was maintained at 110°C. The recovered product (3.6 grams) was identified as starting nitroketone and no amide was detected. Repeating the procedure employing dichloroacetic acid gave approximately identical results and no amide was detected.

EXAMPLE IV

A solution of 11.4 grams (0.042 mole) of 1-nitro-2-hexadecanone in 100 grams (1.8 mole) of anhydrous formic acid is heated to about 100°C. for about 24 hours. After cooling the reaction mixture to below 60°C. and diluting with an equal volume of water, the resulting crystals are collected and successively twice washed with 100 milliliters of 5 percent sodium hydroxide and 100 milliliters of water. The recovered crystals, are identified by infrared and nuclear magnetic to be pentadecanamide.

EXAMPLE V

A solution of 1.73 grams (0.01 mole) of 1-nitro-2-octanone in 100 grams (1.8 mole) of 97 percent formic acid is refluxed for 24 hours. After diluting the cooled reaction mixture to below 60°C., an equal volume of water is added and the resulting crystals are collected and identified as heptanamide.

We claim:

1. A method of preparing an alkylamide which comprises contacting a nitroketone with formic acid.

2. A method according to claim 1 wherein said contacting is at a temperature of about 80° to about 160°C.

3. A method according to claim 1 wherein said contacting is at a temperature of about 90° to 130°C.

4. A method according to claim 1 wherein the mole ratio of said nitroketone to formic acid is between about 1:5 and 1:350.

5. A method according to claim 1 wherein the mole ratio of said nitroketone to formic acid is between about 1:10 and 1:200.

6. A method according to claim 1 wherein said nitroketone corresponds to the formula:

where R is an alkyl group of from 1 to 50 carbon atoms.

7. A method according to claim 6 wherein R is 5 to 30 carbons.

8. A method according to claim 1 wherein said nitroketone is 1-nitro-2-hexadecanone.

9. A method according to claim 1 wherein said nitroketone is 1-nitro-2-octadecanone.

10. A method according to claim 1 wherein said nitroketone is 1-nitro-2-octanone.

* * * * *